United States Patent [19]

Maruyama et al.

[11] Patent Number: 5,503,930
[45] Date of Patent: Apr. 2, 1996

[54] LAYER STRUCTURE OXIDE

[75] Inventors: Satoshi Maruyama; Makoto Kondo, both of Chiba, Japan

[73] Assignee: TDK Corporation, Tokyo, Japan

[21] Appl. No.: 273,691

[22] Filed: Jul. 12, 1994

[30] Foreign Application Priority Data

| Mar. 7, 1994 | [JP] | Japan | 6-062107 |
| Apr. 8, 1994 | [JP] | Japan | 6-095563 |
| Jun. 8, 1994 | [JP] | Japan | 6-150475 |

[51] Int. Cl.$^6$ ............ B32B 15/04; B32B 18/00; H01M 4/52

[52] U.S. Cl. ............ 428/402; 428/689; 428/699; 428/700; 428/701; 428/702; 429/218; 429/221; 429/223; 429/228

[58] Field of Search ............ 428/688, 689, 428/699, 700, 701, 702, 402; 429/218, 223, 221, 225, 228, 224; 423/594, 595, 596; 252/182.1; 501/126, 132, 10; 106/287.18, 287.19

[56] References Cited

U.S. PATENT DOCUMENTS 4,567,031  1/1986  Riley .................... 423/593
5,286,582  2/1994  Tahara .................. 429/218
5,378,560  1/1995  Tomiyama ............. 429/217

FOREIGN PATENT DOCUMENTS

| 0484187 | 5/1992 | European Pat. Off. . |
| 4-253162 | 9/1992 | Japan . |
| 5-290849 | 11/1993 | Japan . |

OTHER PUBLICATIONS

Database WPI, Derwent Publications, AN–88–289203, JP–63–211565, Sep. 2, 1988.

*Primary Examiner*—Ellis P. Robinson
*Assistant Examiner*—Leonidas J. Jones, III
*Attorney, Agent, or Firm*—Oblon, Spivak, McClelland, Maier, & Neustadt

[57] ABSTRACT

In a layer structure oxide in crystallite form having a composition of the formula: $AMO_2$ wherein A is Li or Na and M is Co, Ni, Fe or Cr, at least one additive element Z which is Bi, Pb or B is present in the form of an oxide on the surface of crystallites or between crystallites. Atomic ratio Z/M is from 0.0001 to 0.1. Since the crystallites have an increased size, the layer structure oxide has improved properties and is suitable for use as a positive electrode material of a secondary cell.

11 Claims, 7 Drawing Sheets

5 μm

10 μm

LiNiO₂

LAYER STRUCTURE OXIDE

BACKGROUND OF THE INVENTION

1. Field of the Invention

This invention relates to a layer structure oxide as typified by oriented $LiCoO_2$ which is suitable for use in a secondary cell as a positive electrode.

2. Prior Art

From the past, layer structure or lattice compounds have drawn attention for their unique properties. These compounds allow intercalation of a guest substance between their layers because of their layer structure and exhibit electrical anisotropy because of their crystallographic anisotropy. Exemplary applications utilizing such nature include lithium cell positive electrodes utilizing intercalation of lithium ions and conductor wires using oriented superconducting oxides.

Such layer structure compounds have a structure as shown in FIG. 8 which depicts the structure of $LiNiO_2$ as a typical example. Ions migrate between the layers shown in FIG. 8 in a two-dimensional manner, allowing for intercalation of Li ions. In an application as the secondary cell positive electrode material, it is desired to make use of this feature as much as possible. Ideally, the compound should exist continuous, for example, as a single crystal as long as necessary. If the compound takes a polycrystalline form, the boundary region becomes a barrier against ion transport.

It was proposed to use a layer structure composite oxide such as $AMO_2$ wherein A is Li or Na and M is a transition metal such as Co and Mn as the positive electrode material of a lithium secondary cell. For example, Japanese Patent Publication (JP-B) No. 59507/1988 discloses $Li_xM_yO_2$ wherein M is Co or Ni, x is 0.8 or less, and y is approximately equal to 1 and wherein $Li^+$ cation vacancies are created in the ion conductor by extraction of $Li^+$ cations. Japanese Patent Application Kokai (JP-A) NO. 253162/1992 discloses $LiCoO_2$ wherein part of Co is substituted by at least one element selected from the group consisting of Pb, Bi, and B, with the composition $LiCo_{0.90}Pb_{0.10}O_2$ and the corresponding compositions wherein Pb is replaced by Bi or B being exemplified therein.

Also JP-A 290849/1993 discloses the preparation of $LiCoO_2$ by mixing a source powder with a binder, granulating and firing. It is attempted to employ the granulating step prior to the firing step in order to increase the sintered grain size (which grains are not always single crystals), thereby reducing a self discharge rate and achieving some improvements. Although the reason why properties are improved is not described in JP-A 290849/1993, it is presumed that the self discharge rate lowers with an increasing grain size because the proportion of lithium ions that diffuse outward from the sintered grains is reduced. If this concept is applied to layer structure compounds, it is expected that their properties can be improved by increasing the size of crystallites.

We thus found that in order to make use of the characteristic feature of a layer structure compound as a positive electrode material, it is important that the compound have an increased crystallite size and be continuous as long as necessary. It is important to promote conversion of individual grains into crystallites and at the same time, to increase the size of crystallites. Based on this finding, we made efforts to develop a layer structure compound which takes a crystallite form not found in the prior art.

SUMMARY OF THE INVENTION

Therefore, an object of the present invention is to provide a novel and improved layer structure oxide of the $AMO_2$ composition in which crystallites are increased in size to improve the properties associated therewith, for example, cell charge/discharge properties, ion conductivity, and charge mobility.

Another object of the present invention is to provide such a layer structure oxide which will find use as a secondary cell positive electrode material, solid electrolyte material, and gas sensor material.

According to the present invention, it is provided a layer structure oxide in crystallite form, having a composition of the formula: $AMO_2$ wherein A is at least one of lithium and sodium and M is at least one member selected from the group consisting of cobalt, nickel, iron, and chromium. At least one additive element Z selected from the group consisting of bismuth, lead, and boron is present in the form of an oxide on the surface of crystallites or between crystallites.

Preferably, the atomic ratio of additive element Z to element M, Z/M, is from 0.0001 to 0.1.

In one preferred embodiment, the layer structure oxide is prepared by adding additive element Z to a source powder of the layer structure oxide, followed by firing; or by adding additive element Z to a mixture of a source compound of element A and a source compound of element M, followed by firing. Also preferably, element A is further added so as to give an atomic ratio A/Z of up to 2, prior to firing.

Preferably, the crystallites have a mean diameter of at least 2 μm.

On X-ray diffractometry analysis of the layer structure oxide, (003) and (104) peaks appear in the X-ray diffraction spectrum. Preferably peak intensity ratio $I_{003}/I_{104}$ is at least 2 wherein $I_{003}$ and $I_{104}$ are the intensity of (003) and (104) peaks, respectively. This is achievable by firing the material at a temperature of at least 1,000° C. or under pressure.

The layer structure oxide of the invention is useful as a positive electrode of a secondary cell.

According to the present invention, a layer structure oxide in crystallite form having a composition of the formula: $AMO_2$ wherein A is at least one of lithium Li and sodium Na and M is at least one member selected from the group consisting of cobalt Co, nickel Ni, iron Fe, and chromium Cr is prepared by starting with (i) a powder of an oxide having the composition of $AMO_2$ and a crystalline structure or (ii) a raw material powder mix to form such an oxide as a source material, and adding an additive element Z selected from the group consisting of bismuth Bi, lead Pb, and boron B to the source material so as to give an atomic ratio of Z/M in the predetermined range, followed by firing. This helps the resulting layer structured oxide $AMO_2$ form and grow crystallites, thereby improving the properties thereof.

Such a compound is obtained by firing a raw material compound. Making a close study on the firing process, we have found that by adding Bi, Pb or B as a trace amount additive to a powder of an oxide having the composition of $AMO_2$ and a crystalline structure or a raw material powder mix to form such an oxide, a low melting point glass component can be involved in the re-sintering process, thereby significantly promoting formation and growth of $AMO_2$ layer structured compound crystallites in the sintered body.

With a trace amount of additive element Z (Bi, Pb or B) in oxide form added to a powder of an oxide having the composition of $AMO_2$ and a crystalline structure or a raw material powder mix to form such an oxide, crystallites of $LiCoO_2$ which are agglomerated into giant hexagonal plates as compared with conventional additive element-free samples are observed in the sintered body. Then when the layer structure oxide of the invention is used as a positive electrode material, the resulting secondary cell has improved charge/discharge performance.

By adding additive element Z (Bi, Pb or B) and firing at a temperature of 1,000° C. or higher, there are obtained partially or entirely layer structured, crystallized, oriented amorphous microcrystalline grains or crystallites having a large diameter. By firing under pressure, there are also obtained oriented microcrystalline grains. Compared with conventional compounds which are less oriented, orientation insures an increased charge/discharge capacity. One of carbon materials which are currently used as the negative electrode material is meso-phase carbon. It consists of carbon microparticulates which are internally graphitized and hence, microcrystallized and oriented. Battery manufacturers are interested in meso-phase carbon since it provides a lithium secondary cell with an increased charge/discharge capacity when used as the negative electrode material. This is probably because individual particulates are internally increased in orientation and crystallinity to enhance the stability of particulates and promote the diffusion of lithium ions. Investigating the preparation of secondary agglomerates of oriented crystallites or microcrystallized secondary agglomerates which will behave similarly, we have found that microcrystallized oriented particulates can be obtained by adding an additive element Z (Bi, Pb or B) and firing at elevated temperature above 1000° C. or under pressure.

DESCRIPTION OF THE PREFERRED EMBODIMENTS

The layer structure oxide of the invention is an oxide containing a basic composition represented by $AMO_2$ as well as a layer structure oxide used as a starting source material in one embodiment of the invention. The layer structure oxide of the invention is prepared by adding at least one additive element Z to the starting source material which is either an oxide of $AMO_2$ or a mixture of a source compound from which element A is derived and a source compound from which element M is derived. The additive element is selected from the group consisting of bismuth (Bi), lead (Pb), and boron (B).

Element A is at least one of lithium (Li) and sodium (Na). It may be a mixture of Li and Na at any desired ratio. Preferred element A should essentially contain 20 to 100% of Li.

Element M is at least one member selected from the group consisting of cobalt (Co), nickel (Ni), iron (Fe), and chromium (Cr). It may be a mixture of two or more such elements at any desired ratio.

Figure 8:
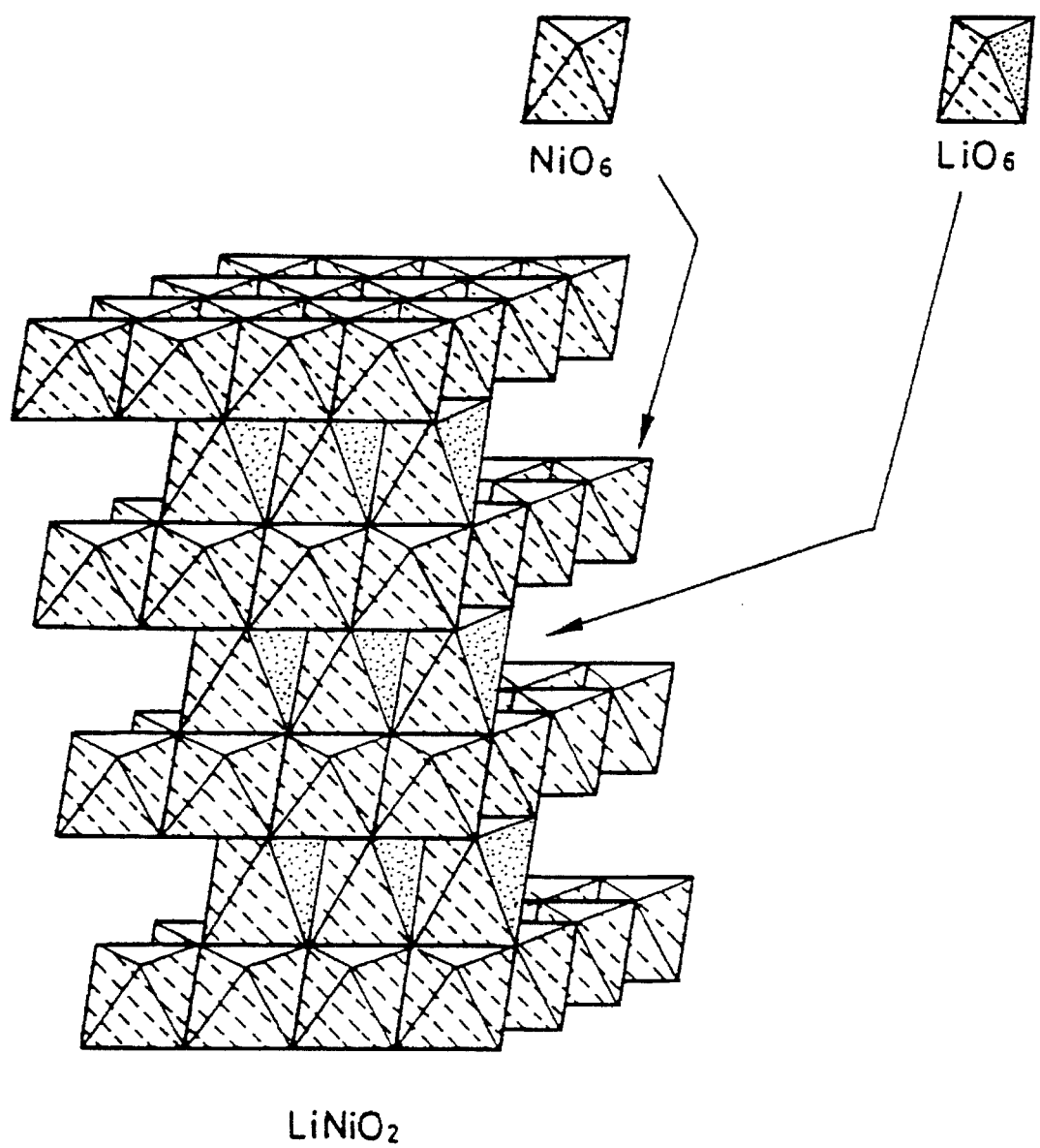
FIG. 8 is a schematic view showing the structure of a typical layer structure oxide $LiNiO_2$.

As is well known in the art, compounds of $AMO_2$ type have a layer structure or lattice as shown in FIG. 8. On X-ray diffraction (XRD) analysis, the oxides of the invention are also observed to have such a layer structure.

At least one additive element Z selected from the group consisting of Bi, Pb, and B is added in an amount so as to give an atomic ratio Z/M of 0.1 or lower. By adding a minor amount of element Z, particulates in the layer structure oxide of the invention are converted into crystallites and growth of crystallites is promoted to increase the crystallite size. In the inner parts of crystallites a second phase associated with additive element Z is not detected and each crystallite exists like a single crystal. If additive element Z is added so as to give an atomic ratio Z/M in excess of 0.1, additive element Z would appear to inhibit the crystallites from existing as single crystals, and acts as an impurity to exacerbate the characteristic properties of the layer structure oxide.

The lower limit of Z/M is not particularly limited, but in practice, it is preferably 0.0001, more preferably 0.0005, especially 0.001. It is to be noted that even if Z/M is less than 0.0001, that is, Z is less than 100 parts by weight per million parts by weight of M, local formation of crystallites is observed. This is a reasonable result when considering the fact that an additive element performs effectively in ferrite and ZnO varistors even when its addition amount is less than 100 ppm. Therefore, the atomic ratio Z/M preferably ranges from 0.001 to 0.1, more preferably from 0.003 to 0.07, especially from 0.008 to 0.04. The additive element Z may be used alone or in admixture of two or three while it is preferred that addition of Bi be essential.

The layer structure oxide of the invention, whether it starts with a layer structure oxide or a mixture of A and M compounds, maintains a layer structure of the basic composition $AMO_2$ after addition of additive element Z and firing. This fact is readily confirmed from the result of X-ray diffraction measurements. The additive element Z remains in the layer structure oxide as fired while keeping its addition amount essentially intact. The presence of additive element Z is confirmed by fluorescent X-ray analysis of the final product or layer structure oxide. In general, the amount of Z left in the final product is about 80 to 100 atom % of the addition amount. In the final product, the atomic ratio A/M as expressed in percent is generally in the range of 15% to 110%. Where additive element Z is not added or the amount of Z added is extremely small, no or few crystallites are observed and thus no or little improvements in properties are found.

It is readily observable from a photomicrograph taken under a scanning electron microscope (SEM) that the final product or layer structure oxide contains crystallites which have grown into hexagonal plates or analogous shapes which are present mutually continuous through minute voids. Namely, as a general rule, crystallites are agglomerated into secondary aggregates.

Crystallites in the layer structure oxide as the final product preferably have an average diameter of at least 2 μm, more preferably at least 2.5 μm, especially at least 3 μm. No particular upper limit is imposed on the average diameter of although the upper limit is generally about 10 μm, preferably 8 μm, especially 6.5 μm in the case of firing at temperatures lower than 1,000° C. or pressureless firing. Also preferably the crystallites have an average aspect ratio (maximum diameter/thickness) between about 2 and about 10.

The average diameter of crystallites is calculated by selecting 10 or 20 crystallites grown into plates, especially hexagonal plates from the SEM photo, determining the maximum dimensions along the major surface as crystallite diameters, and averaging the diameters.

In one embodiment wherein the oxide in the presence of Z is fired at a temperature of at least 1,000° C. or under pressure, crystallites are fused and agglomerated into giant crystallite aggregates or grains. These grains are generally amorphous since fusion has occurred among crystallites in the secondary grains. A part or all of the grain interior is locally or wholly crystallized, layer structured, and oriented locally or over the entire region. These aggregates or grains are also referred to as crystallites throughout the disclosure while their size ranges from 10 μm to 0.5 mm.

In the other embodiment wherein crystallites of a relatively small size are formed, little orientation takes place and only formation and growth of crystallites contributes to an increase of charge/discharge capacity. In this embodiment, the degree of orientation as expressed by an intensity ratio $I_{003}/I_{104}$ is about 0.5 to about 2. Note that in an X-ray diffraction pattern of $AMO_2$, peaks of (003) and (104) appear at $2\theta=18.94°$ and $45.26°$, respectively, in the case of $LiCoO_2$, for example, and the intensity ratio is given by $I_{003}/I_{104}$ wherein $I_{003}$ is the intensity of (003) peak and $I_{104}$ is the intensity of (104) peak. In the one embodiment wherein crystallization takes place locally or over the entire region to form amorphous crystallites or aggregates, $I_{003}/I_{104}$ is at least 2, preferably ranges from about 3 to about 50, especially from about 5 to about 20.

An X-ray diffraction analysis of the layer structure oxide obtained according to the present invention indicates the presence of an oxide of additive element Z (for example, $Bi_2O_3$) in addition to the pure $AMO_2$ composition as a major component. Therefore, not only single crystal crystallites of the basic composition $AMO_2$ are formed, but minor amounts of an oxide of Z and a composite oxide of A and Z are also formed between the crystallites. More specifically, Z is not present in $AMO_2$ crystallites as a partial substitute for M, but Z forms an oxide by itself and a composite oxide with A in a certain form. It is then believed that these oxides are present between crystallites as a vitreous phase during the sintering process, for facilitating material transfer for allowing crystallite growth, thus contributing to the growth of $AMO_2$ crystallites. Where crystallites are further agglomerated into giant aggregates or grains, Z in the form of an oxide by itself and a composite oxide with A is present on the surface of the crystallites or between the crystallites. Then even when crystallites are further agglomerated into giant aggregates, the presence of a second phase between crystallites is important for promoting agglomeration of crystallites. In the absence of a second phase, crystallites are not agglomerated into giant aggregates.

As previously mentioned, JP-A 253162/1992 discloses $LiCoO_2$ wherein part of Co is substituted by at least one element selected from the group consisting of Pb, Bi, and B. The composition $LiCo_{0.90}Pb_{0.10}O_2$ and the corresponding compositions wherein Pb is replaced by Bi or B are exemplified therein. JP-A 253162/1992 definitely states that cobalt is partially replaced by Pb or the like. In this regard, the role the additive element Z plays in the present invention is different. The value of Z/M in JP-A 253162/1992 is far from the range defined in the present invention. Therefore, JP-A 253162/1992 is different from the present invention with respect to construction and the role and result of the additive element.

JP-B 59507/1988 discloses $Li_xM_yO_2$ wherein M is Co or Ni, x is 0.8 or less, and y is approximately equal to 1 and wherein $Li^+$ cation vacancies are created in the ion conductor by extraction of $Li^+$ cations. JP-A 290849/1993 discloses the preparation of $LiCoO_2$ by mixing a source powder with a binder, followed by granulation and firing. None of these references refer to the addition of a trace element. In this sense, the present invention is distinguishable over these references.

The layer structure oxide of the invention is prepared by starting with (i) a mixture of predetermined amounts of a powdery source compound from which element A is derived and a powdery source compound from which element M is derived, or (ii) a powdery oxide $AMO_2$ obtained by firing such a mixture, or (iii) a mixture of the first mentioned mixture and the powdery oxide $AMO_2$; adding a powdery source compound from which element Z is derived to the starting material so as to meet the above-mentioned requirements; and firing the material. This process may be carried out by any of well-known ceramics preparation methods.

The powdery source compound from which element A is derived and the powdery source compound from which element M is derived include oxides and carbonates. Examples of the source compound of element A include lithium carbonate and sodium carbonate. Examples of the source compound of element M include basic cobalt carbonate, cobalt oxide (e.g., $Co_3O_4$), nickel carbonate, nickel oxide, iron oxide (e.g., $Fe_2O_3$ and $Fe_3O_4$), and chromium oxide (e.g., $Cr_2O_3$). Where carbonates and other salts are used as the source compounds, they may be previously dissolved in solvents to form solutions.

The oxides as the source compounds may have any shape including grains, scales and flakes and a mean particle size of about 1 to 2 μm. If particles are not spherical, the mean particle size is calculated by converting the projected areas of particles into circles, from which the diameter is determined.

In the practice of the invention, the source compound powders are mixed by a wet or dry process, preferably by a wet process. Wet milling is generally carried out in a ball mill using a solvent such as isopropyl alcohol and balls of alumina or zirconia with or without resin lining.

In a first embodiment, a powdery source compound of element Z is added to the mixture of predetermined amounts of a powdery source compound of element A and a powdery source compound of element M, followed by milling. Examples of the source compound of element Z include oxides such as bismuth oxide ($Bi_2O_3$), lead dioxide ($PbO_2$), and boron oxide ($B_2O_3$) and carbonates. Where a carbonate is used as the source compound, it may be previously dissolved in a solvent to form a solution. At this point, the compound of element A may be further added to the mixture concurrently with the addition of the compound of element Z to the mixture. This extra or post-addition of the compound of element A is effective for increasing formation of a composite oxide of A and Z between crystallites and thus contributes to microcrystallization of oxide $AMO_2$.

For lithium used as element A, equivalent results are obtained whether or not the lithium compound is post-added. If lithium is finally left in excess, the excess of lithium can be removed by water washing. As the amount of Bi (as typical element Z) added increases, there is an increasing likelihood that $LiBiO_2$ component forms and in turn, oxide $AMO_2$ becomes Li-deficient type $AMO_2$. The post-addition of Li will compensate for such deficiency. However, even without post-addition of Li, the oxide can eventually perform as the positive electrode. This is because the amount of Bi added in the above-mentioned range will prevent deficient type $AMO_2$ from forming to such an extent as not to maintain the crystallographic structure of $LiMO_2$. The amount of A added is preferably such that A/Z is up to 2, more preferably up to 1.7, especially from 1.2 to 1.5. The compound of element Z and the compound of element A to be post added should preferably have a mean particle size of about 0.5 to 2 μm.

The milled source material is then dried, ground and calcined. Calcination is generally done in an oxidizing atmosphere, for example, air and oxygen stream, at a temperature of about 500° to 700° C. for about 2 to 15 hours.

The calcined powder is fired as such or after molding into a suitable shape. Firing is generally done in an oxidizing atmosphere at a temperature of about 700° to 1,000° C., especially about 750° to 950° C. for about 2 to 80 hours. If firing is done at a higher temperature of above 1,000° C., preferably about 1,000° to 1,200° C., especially about 1,000° to 1,100° C., then crystallization and orientation are accomplished.

In the practice of the invention, a granulating method may be used instead of simple mixing as mentioned above. In mixing the compounds of elements A, M and Z, a binder such as polyvinyl alcohol is added to the mixture which is granulated in a wet manner. The amount of the binder is generally less than 10% by weight. The resulting granules are fired under the same conditions as above.

Alternatively, firing may be done under pressure. To this end, hot press or hot isostatic press may be used to provide a pressure of about 10 to 2,000 $kg/cm^2$, especially about 50 to 500 $kg/cm^2$. Firing under pressure also promotes crystallization and orientation.

In a second embodiment, a powdery source compound of element Z is added to a powdery oxide $AMO_2$ obtained by firing a mixture of compounds of elements A and M. The powdery oxide $AMO_2$ used as the starting powder is synthesized by mixing predetermined amounts of a powdery source compound of element A and a powdery source compound of element M, optional molding the mixture into a suitable shape, and firing the mixture. Firing is generally done in an oxidizing atmosphere at a temperature of about 600° to 950° C. for about 2 to 80 hours. The oxidizing atmosphere used herein should preferably have an oxygen partial pressure of at least 0.1 atm, especially 0.2 to 1 atm. The fired product is ground into a powder. The resulting primary particle powder containing layer structure oxide $AMO_2$ generally has a mean particle size of about 0.1 to 1 μm, especially about 0.5 to 1 μm.

Alternatively, the source powder $AMO_2$ can be obtained by a fine powdering process such as co-precipitation, freeze drying and ultrasonic atomization.

To the thus obtained source powder $AMO_2$, a powdery source compound of element Z is added in an amount as mentioned previously. At the same time, the source compound of element A may be additionally added in an amount as mentioned in the first embodiment. The mixture is then fired under the same conditions as previously mentioned in the first embodiment.

In a third embodiment, the source powder $AMO_2$, compound of element A, and compound of element M are mixed so as to give a predetermined ratio, the compound of element Z and optionally the compound of element A are then added to the mixture, and the resulting mixture is fired. In this process, crystallization occurs about nuclei of $AMO_2$ with a size of about 1 μm. Pressure may be applied during firing. Also instead of simply mixing the respective ingredients, the mixture may be wet granulated by adding a binder such as polyvinyl alcohol to the ingredients being milled. The mixture is finally fired. In the thus obtained sintered body, the presence of crystallites of a desired size is observed.

A secondary cell is fabricated using the layer structure oxide of the invention as a positive electrode material. The remaining cell components are not limited and conventional ones may be employed.

In general, the positive electrode is prepared by mixing the layer structure oxide of the invention in powder form with a conductive aid (e.g., acetylene black) and a binder (e.g., tetrafluoroethylene) to form a positive electrode compound, which is molded under pressure or coated. The compound usually contains about 60 to 90% by weight of the layer structure oxide, about 5 to 20% by weight of the conductive aid, and about 5 to 20% by weight of the binder. The negative electrode material may be lithium metal, a lithium alloy (e.g., Li—Al, Li—Sn, and Li—Pb) or lithium ion-intercalated graphite.

The electrolyte solution may be a solution of an electrolyte in an organic solvent. Examples of the organic solvent which can be used herein include esters such as propylene carbonate, ethylene carbonate and γ-butyrolactone; ethers such as diethyl ether, tetrahydrofuran, substituted tetrahydrofuran, dioxolan, pyran and derivatives thereof, dimethoxyethane, and diethoxyethane; and 3-substituted-2-oxazolidinones such as 3-methyl-2-oxazolidinone, alone or in admixture of two or more. Examples of the electrolyte which can be used herein include lithium perchlorate, lithium borofluoride, lithium phosphofluoride, lithium chloroaluminate, lithium halides, and lithium trifluoromethanesulfonate. A solid electrolyte may be used instead of the electrolyte solution.

The cell may take any of conventional shapes including cylindrical, rectangular, coin, and button shapes.

Since the positive material is constructed of the layer structure oxide of the invention, the secondary cell has improved performance as demonstrated by an electric discharge capacity per cycle of about 130 to 150 Wh/kg and a charge/discharge efficiency of higher than 90%. Note that the discharge capacity is determined by charging the cell up to the upper limit voltage of 4.1 V, continuing constant voltage charging at the voltage of 4.1 V for 10 hours, and allowing the cell to discharge until the lower limit voltage of 3.1 V was reached.

The layer structure oxide of the invention can be used as a cell positive electrode material which utilizes intercalation of alkali ions into the oxide's crystal lattices as mentioned above. The oxide may also be used in a solid cell based on a solid electrolyte which utilizes alkali ion conductivity and a gas sensor which utilizes a junction between cobalt oxide and nickel oxide or another metal oxide.

EXAMPLE

Examples of the present invention are given below by way of illustration and not by way of limitation.

EXAMPLE 1

To a mixture of 81.29 grams of lithium carbonate having a mean particle size of 2 μm and 260.8 grams of basic cobalt carbonate having a mean particle size of 2 μm, bismuth oxide having a mean particle size of 2 μm was added so as to give a Bi/Co atomic ratio of 0.01. The ingredients were wet milled in a ball mill containing alumina balls together with 50 grams of isopropyl alcohol.

The mixture was dried, ground and thereafter calcined in air for 10 hours at a holding temperature of 588° C. The calcined powder was shaped into a pellet under a pressure of 1 ton/cm$^2$, which was fired in an electric furnace under conditions: a firing atmosphere of air, a holding temperature of 850° C., and a firing time of 20 hours. This is designated sintered pellet sample No. 1.

Sample No. 2 was prepared by the same procedure as sample No. 1 except that bismuth was omitted.

Figure 1:
FIG. 1 is a SEM photomicrograph of sample No. 1 (fired at 850° C.) within the scope of the invention, showing a grain structure.
Figure 2:
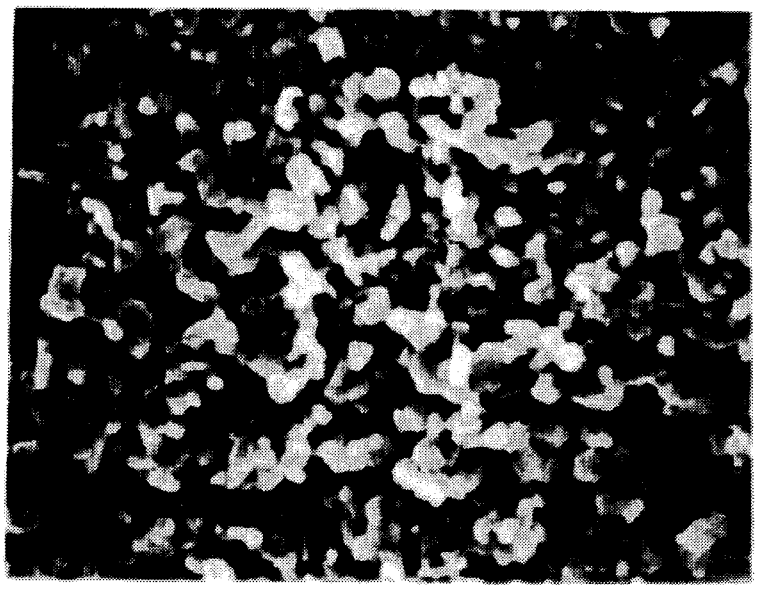
FIG. 2 is a SEM photomicrograph of sample No. 2 outside the scope of the invention, showing a grain structure.

Sample Nos. 1 and 2 were observed under a scanning electron microscope (SEM). The photomicrographs of sample Nos. 1 and 2 are shown in FIGS. 1 and 2, respectively. As seen from the photo of FIG. 1, LiCoO$_2$ is observed as having grown into crystallite plates due to the addition of bismuth. In contrast, few crystallites are observed in the FIG. 2 photo of the bismuth-free sample.

The crystallites of sample No. 1 had an average diameter (average crystallite size) of 4.5 μm. The average diameter was calculated by selecting crystallites grown into hexagonal plates from the SEM photo, determining the maximum dimensions as crystallite diameters, and averaging the diameters.

Figure 3:
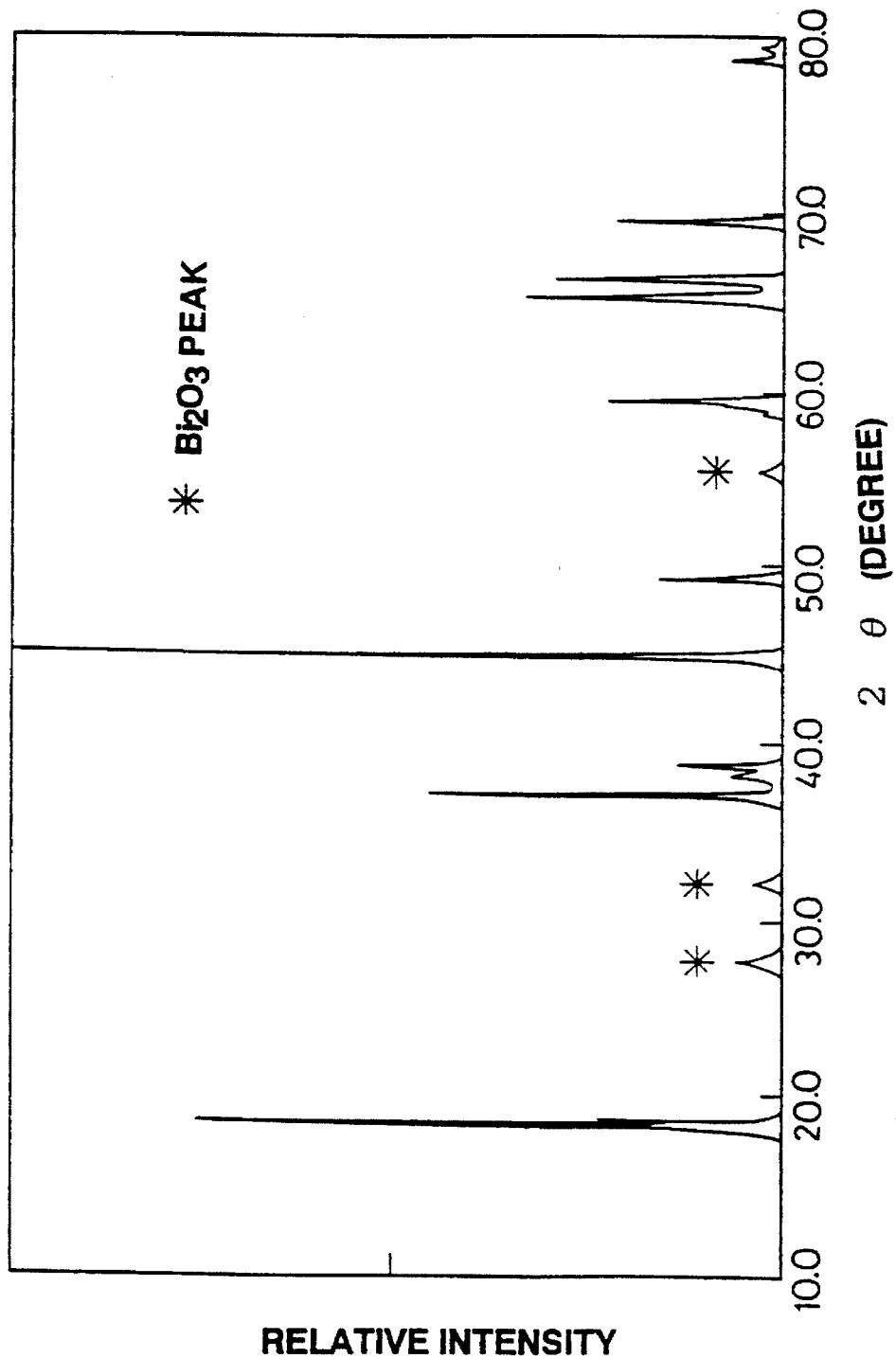
FIG. 3 is an X-ray diffraction pattern of sample No. 1.

Sample No. 1 was also analyzed by X-ray diffractometry. The X-ray diffraction diagram is shown in FIG. 3. Pure LiCoO$_2$ was observed in the X-ray diffraction spectrum and Bi$_2$O$_3$ was detected. It is thus believed that the bismuth added forms an oxide and a composite oxide with lithium in a certain form and segregates at the grain boundary for facilitating material transfer for allowing crystallite growth.

Also in sample No. 1, the presence of Bi was confirmed by fluorescent X-ray analysis. Sample Nos. 1 and 2 were measured to have a sintered density of 3.55 g/cm$^3$ and 3.40 g/cm$^3$, respectively. As will be described later, in this composition region, the sintered density is somewhat increased as compared with that of a bismuth-free Sample, but the difference is very small. The shrinkage factor was approximately 90%. These indicate that only the crystallite size increased rather than the progress of sintering.

It is to be noted that the sintered density and shrinkage factor are measured as follows.

Sintered density

The weight of a pellet per unit volume was measured by an Archimedes' method.

Shrinkage factor

A pellet having a diameter of 10 mm and a thickness of 3 mm was measured for diameter both after shaping and after firing. The shrinkage factor is the diameter after firing divided by the diameter after shaping, expressed in percent.

EXAMPLE 2

Samples were prepared by the same procedure as in Example 1 except that the atomic ratio of Bi/Co was changed to 0.0001, 0.001, 0.03, 0.05, 0.1, and 0.3. These samples were designated sample Nos. 3 to 8 in the described order. In all the samples, the presence of Bi was confirmed by fluorescent X-ray analysis.

As in Example 1, sample Nos. 3 to 8 were observed under a SEM. Crystallites grown into hexagonal plates as in sample No. 1 of Example 1 were observed in sample Nos. 3 to 7. In sample No. 8 having a Bi/Co ratio of 0.3, however, no such crystallites were observed. An X-ray diffraction analysis revealed that sample No. 8 was not of a single phase, but LiBiO$_2$ was co-present.

Sample No. 1 of Example 1 and sample Nos. 3–7 of Example 2 were determined for average crystallite size. In sample Nos. 2 and 8 where no crystallites were present, the average diameter of crystal grains in the sample was determined. The average crystal size is plotted relative to an atomic ratio of Bi/Co in the diagram of FIG. 4. Similarly, the sintered density of sample Nos. 1 to 8 is plotted relative to an atomic ratio of Bi/Co in the diagram of FIG. 5.

Figure 4:
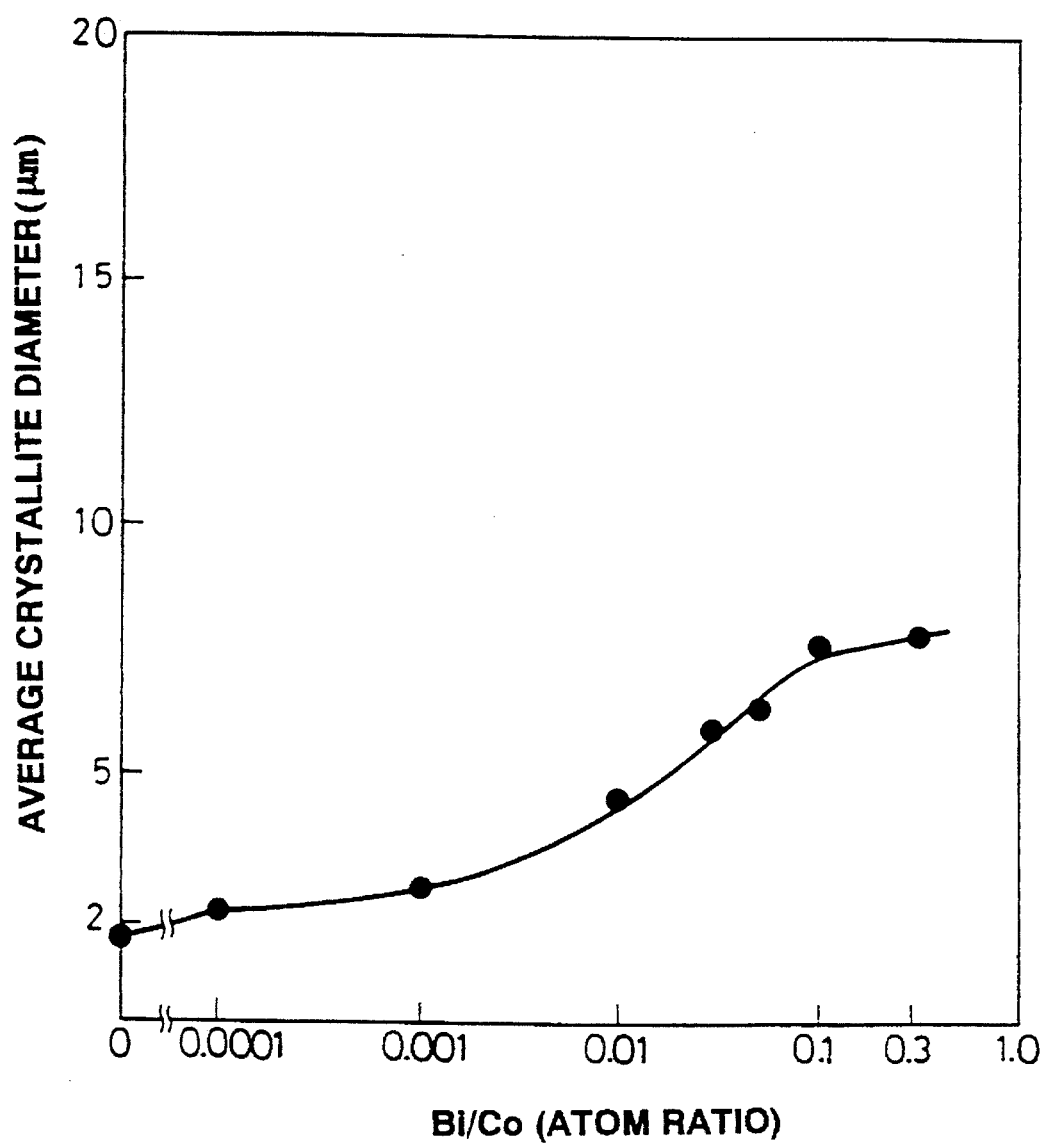
FIG. 4 is a graph showing the average crystal size as a function of a Bi/Co atomic ratio.
Figure 5:
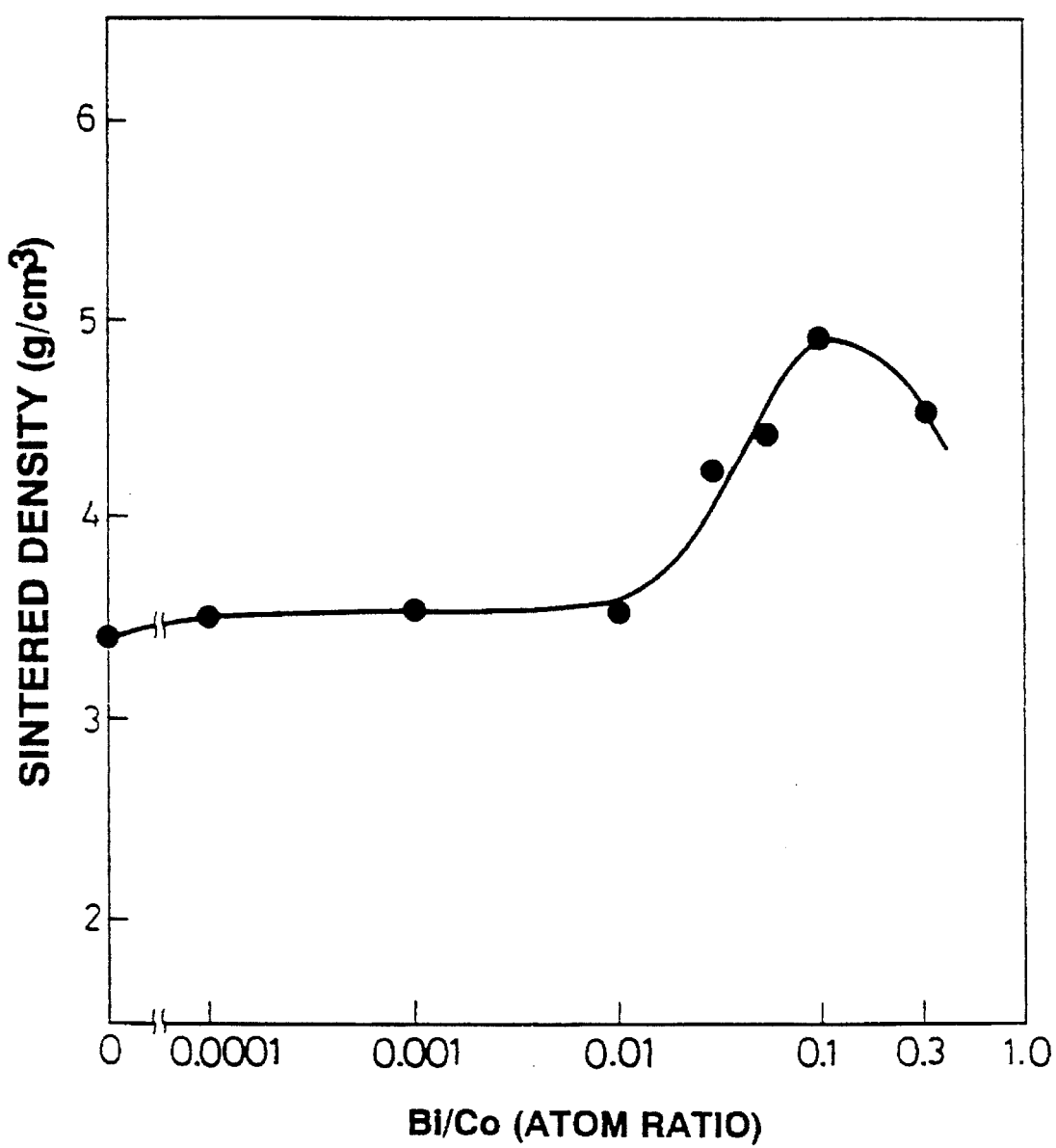
FIG. 5 is a graph showing the sintered density as a function of a Bi/Co atomic ratio.

It is seen from FIG. 4 that the average crystal size increases with an increase of the amount of Bi added. It is seen from FIG. 5 that the sintered density increases with an increase of the amount of Bi added in a Bi/Co ratio range reaching about 0.1. Such an increase is very slight in a Bi/Co ratio range reaching about 0.01. Inversely, with a Bi/Co ratio exceeding 0.1, the sintered density decreases. This decrease of sintered density at a Bi/Co ratio in excess of 0.1 is attributable to evaporation of Bi.

Addition of bismuth in an amount to give a Bi/Co atomic ratio of up to about 0.01 does not contribute to an increase of sintered density, but to an increase of crystallite size. Addition of bismuth in an amount to give a Bi/Co atomic ratio of from about 0.01 to about 0.1 contributes to an increase of both crystallite size and sintered density. Within this range, the presence of a second phase component as observed at a Bi/Co of 0.3 is negligible.

It is thus presumed that for a layer structure oxide having the basic composition of LiCoO$_2$, an increase of crystallite size is expectable and the influence of a second phase component which would otherwise exacerbate the properties of the oxide is restrained insofar as the Bi/Co atomic ratio is 0.1 or less. From these results, a Bi/Co atomic ratio of 0.1 or less is effective for improving the properties of a layer structure oxide.

EXAMPLE 3

A lithium cell system was fabricated using sample No. 1 of Example 1 as a positive electrode material. The positive electrode was prepared by mixing sample No. 1 as a positive electrode active material, acetylene black, and polytetrafluoroethylene in a weight ratio of 100:20:3 and molding the mixture under pressure into a pellet having a diameter of 15 mm. The negative electrode used herein was lithium metal. The electrolytic solution used was prepared by dissolving 1M lithium perchlorate (LiClO$_4$) as an electrolyte in propylene carbonate. The thus fabricated cell is designated cell A.

Cells designated cells B, C and D were fabricated by the same procedure as above except that sample Nos. 2, 5 and 8 of Examples 1 and 2 were respectively used as the positive electrode active material instead of sample No. 1. Note that cells B and D are comparative cells.

These cells, A to D, were determined for an electric discharge capacity by charging the cell up to the upper limit voltage of 4.1 V, continuing constant voltage charging at the voltage 4.1 V for 10 hours, and allowing the cell to discharge until the lower limit voltage of 3.1 V was reached.

The results are shown in Table 1 together with the atomic ratio of Bi/Co, average crystallite diameter, and crystallite aspect ratio.

TABLE 1

| | | Positive electrode material | | | |
|---|---|---|---|---|---|
| | | Bi/Co | Crystallites | | Discharge |
| Sample No. | | atom ratio | Average diameter | Aspect ratio | capacity (Wh/kg) |
| A | 1 | 0.01 | 4.5 μm | 4.0 | 149 |
| B | 2* | 0 | — | — | 105 |
| C | 5 | 0.03 | 6.0 μm | 4.0 | 142 |
| D | 8* | 0.3 | — | — | 107 |

*The presence of crystallites was not acknowledged.

As seen from Table 1, the cells using the inventive samples as the positive electrode active material have a greater discharge capacity than the comparative cells. A high discharge capacity is available especially when Bi/Co is in the range of 0.008 to 0.04. Better properties are obtained within this range because the crystallite size increases and formation of a second phase component as an impurity is restrained.

EXAMPLE 4

Samples were prepared by the same procedure as sample No. 1 of Example 1 except that lead dioxide or boron oxide was used instead of bismuth oxide. These samples are designated sample Nos. 11 and 12. Sample No. 11 had a Pb/Co atom ratio of 0.01 and Sample No. 12 had a B/Co atom ratio of 0.01. The presence of crystallites was confirmed in these samples.

Using these samples as the positive electrode active material, lithium cell systems were fabricated as in Example 3. The cells using sample Nos. 11 and 12 had a discharge capacity of 137 Wh/kg and 133 Wh/kg, respectively. These discharge capacity values are lower than that of the corresponding bismuth added sample, but superior to those of additive element-free samples.

Additional samples were prepared by the same procedure as sample Nos. 1 and 2 of Example 1 except that sodium carbonate was used instead of the lithium carbonate and nickel carbonate, nickel oxide, iron oxide or chromium oxide was used instead of the basic cobalt carbonate. These samples showed a similar tendency to sample Nos. 1 and 2 of Example 1 depending on the atomic ratio of Z/M. Further, as in Example 3, lithium cells were fabricated from the additional samples and determined for discharge capacity. The cells showed a similar tendency depending on the atomic ratio of Z/M.

Further additional samples were similarly prepared by adding two or more of basic cobalt carbonate, nickel carbonate (or nickel oxide), iron oxide, and chromium oxide in any desired proportion. These samples showed a similar tendency depending on the atomic ratio of Z/M.

EXAMPLE 5

A mixture of 81.29 grams of lithium carbonate having a mean particle size of 2 μm and 260.8 grams of basic cobalt carbonate having a mean particle size of 2 μm was wet milled in a ball mill containing alumina balls together with 50 grams of isopropyl alcohol. The mixture was dried, ground and thereafter fired in air for 10 hours at a holding temperature in the range of 600° to 900° C.

The thus obtained lithium cobaltate was ground to a mean particle size of 1 μm. Bismuth was added thereto in the form of oxide $Bi_2O_3$ having a mean particle size of 0.5 μm so as to give a Bi/Co atomic ratio of 0.01, and lithium was also added thereto in the form of carbonate $Li_2CO_3$ having a mean particle size of 0.5 μm so as to give a Li/Bi atomic ratio of 1.5. These source powder ingredients were wet milled. The milled powder was shaped into a pellet under a pressure of 1 ton/cm$^2$, which was fired in an electric furnace under conditions: a firing atmosphere of air, a holding temperature of 850° C., and a firing time of 10 hours. This is designated sintered pellet sample No. 21.

Sample No. 22 was prepared by the same procedure as sample No. 21 except that bismuth was omitted.

Sample Nos. 21 and 22 were observed under a SEM. In sample No. 21, $LiCoO_2$ was observed as having grown into crystallite plates due to the addition of bismuth. In contrast, few crystallites were observed in the bismuth-free sample No. 22.

The crystallites of sample No. 21 had an average diameter (average crystallite size) of 4.7 μm. The average diameter was calculated by selecting crystallites grown into hexagonal plates from the SEM photo, determining the maximum dimensions as crystallite diameters, and averaging the diameters.

Sample No. 21 was also analyzed by X-ray diffractometry. Pure $LiCoO_2$ was observed in the X-ray diffraction spectrum and $Bi_2O_3$ was detected. Also a peak attributable to $LiBiO_2$ was observed though weak. It is thus believed that the bismuth added forms an oxide and a composite oxide with lithium in a certain form and segregates between crystallites for facilitating material transfer for allowing crystallite growth.

Also in sample No. 21 as fired, the presence of Bi was confirmed by fluorescent X-ray analysis. Sample Nos. 21 and 22 were measured to have a sintered density of 3.48 g/cm$^3$ and 3.44 g/cm$^3$, respectively. In this composition region, the sintered density is somewhat increased as compared with that of a bismuth-free sample, but the difference is very small. The shrinkage factor was approximately 90%. These indicate that only the crystallite size increased rather than the progress of sintering.

EXAMPLE 6

Samples were prepared by the same procedure as in Example 5 except that the atomic ratio of Bi/Co was changed to 0.0001, 0,001, 0.03, 0.05, 0.1, and 0.3. These samples were designated sample Nos. 23 to 28 in the described order. The amount of lithium was to give a Li/Bi atomic ratio of 1.5 as in Example 5.

In all the samples, the presence of Bi was confirmed by fluorescent X-ray analysis.

As in Example 5, sample Nos. 23 to 28 were observed under a SEM. Crystallites grown into a hexagonal plate as in sample No. 21 of Example 5 were observed in sample Nos. 23 to 27. In sample No. 28 having a Bi/Co ratio of 0.3, however, no such crystallites were observed. An X-ray diffraction analysis revealed that sample No. 28 was not of a single phase, but $LiBiO_2$ was co-present.

Sample No. 21 of Example 5 and sample Nos. 23–27 of Example 6 were determined for average crystallite size. In sample Nos. 22 and 28 where no crystallites were present, the average diameter of crystal grains in the sample was determined. The average crystal size was plotted relative to an atomic ratio of Bi/Co like the diagram of FIG. 4. Similarly, the sintered density of sample Nos. 21 to 28 was plotted relative to an atomic ratio of Bi/Co like the diagram of FIG. 5. The following was found from these data. Addition of bismuth in an amount to give a Bi/Co atomic ratio of up to about 0.01 does not contribute to an increase of sintered density, but to an increase of crystallite size. Addition of bismuth in an amount to give a Bi/Co atomic ratio of from about 0.01 to about 0.1 contributes to an increase of both crystallite size and sintered density. Within this range, the presence of a second phase component as observed at a Bi/Co of 0.3 is negligible.

It is thus presumed that for a layer structure oxide having a basic composition of $LiCoO_2$, an increase of crystallite size is expectable and the influence of a second phase component which would otherwise exacerbate the properties of the oxide is restrained insofar as the Bi/Co atomic ratio is 0.1 or less. From these results, a Bi/Co atomic ratio of 0.1 or less is effective for improving the properties of a layer structure oxide.

EXAMPLE 7

A lithium cell system was fabricated using sample No. 21 of Example 5 as a positive electrode material. The positive electrode was prepared by mixing sample No. 21 as a positive electrode active material, acetylene black, and polytetrafluoroethylene in a weight ratio of 100:20:3 and molding the mixture under pressure into a pellet having a diameter of 15 mm. The negative electrode used herein was lithium metal. The electrolytic solution used was prepared by dissolving 1M lithium perchlorate ($LiClO_4$) as an electrolyte in propylene carbonate. The thus fabricated cell is designated cell X.

Cells designated cells Y, Z and W were fabricated by the same procedure as above except that sample Nos. 22, 25 and 28 of Examples 5 and 6 were respectively used as the positive electrode active material instead of sample No. 21. Note that cells Y and W are comparative cells.

These cells X, Y, Z and W were determined for an electric discharge capacity by charging the cell up to the upper limit voltage of 4.1 V, continuing constant voltage charging at the voltage 4.1 V for 10 hours, and allowing the cell to discharge until the lower limit voltage of 3.1 V was reached.

The results are shown in Table 2 together with the atomic ratio of Bi/Co, average crystallite diameter, and crystallite aspect ratio.

TABLE 2

| | Positive electrode material | | | |
|---|---|---|---|---|
| | Bi/Co | Crystallites | | Discharge |
| Sample No. | atom ratio | Average diameter | Aspect ratio | capacity (Wh/kg) |
| X  21  | 0.01 | 4.7 µm | 5.0 | 142 |
| Y  22* | 0    | —      | —   | 104 |
| Z  25  | 0.03 | 5.8 µm | 4.5 | 147 |
| W  28* | 0.3  | —      | —   | 108 |

*The presence of crystallites was not acknowledged.

As seen from Table 2, the cells using the inventive samples as the positive electrode active material have a greater discharge capacity than the comparative cells. A high discharge capacity is available especially when Bi/Co is in the range of 0.008 to 0.04. Better properties are obtained within this range because the crystallite size increases and formation of a second phase component as an impurity is restrained.

EXAMPLE 8

Samples were prepared by the same procedure as sample No. 21 of Example 5 except that lead dioxide or boron oxide was used instead of bismuth oxide. These samples are designated sample Nos. 31 and 32. Sample No. 31 had a Pb/Co atom ratio of 0.01 and Sample No. 32 had a B/Co atom ratio of 0.01. The presence of crystallites was confirmed in these samples.

Using these samples as the positive electrode active material, lithium cell systems were fabricated as in Example 7. The cells using sample Nos. 31 and 32 had a discharge capacity of 136 Wh/kg and 132 Wh/kg, respectively. These discharge capacity values are lower than that of the corresponding bismuth added sample, but superior to those of additive element-free samples.

Additional samples were prepared by the same procedure as sample Nos. 21 and 22 of Example 5 except that sodium carbonate was used instead of the lithium carbonate and nickel carbonate, nickel oxide, iron oxide or chromium oxide was used instead of the basic cobalt carbonate. These samples showed a similar tendency to sample Nos. 21 and 22 of Example 5 depending on the atomic ratio of Z/M. Further, as in Example 7, lithium cells were fabricated from the additional samples and determined for discharge capacity. The cells showed a similar tendency depending on the atomic ratio of Z/M.

Further additional samples were similarly prepared by adding two or more of basic cobalt carbonate, nickel carbonate (or nickel oxide), iron oxide, and chromium oxide in any desired proportion. These samples showed a similar tendency depending on the atomic ratio of Z/M.

Further additional samples were prepared as in Example 5 except that sodium in the form of $Na_2CO_3$ was post-added concurrently with bismuth so as to give a Na/Bi atomic ratio in the range of from 0.8 to 2. Equivalent results were obtained.

EXAMPLE 9

Figure 6:
FIG. 6 is a SEM photomicrograph of sample No. 33 (fired at 1100° C.) within the scope of the invention, showing a grain structure.
Figure 6:
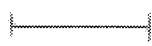

Sample No. 33 was prepared by the same procedure as sample No. 1 of Example 1 except that the firing conditions were changed to 1,100° C. and 36 hours. FIG. 6 is a SEM photograph of sample No. 33. It reveals that crystallites in sample No. 1 as found in the photo of FIG. 1 partially crystallized into amorphous large crystallite grains, forming a laminar structure. The grain size was about 20 to 100 µm.

Figure 7:
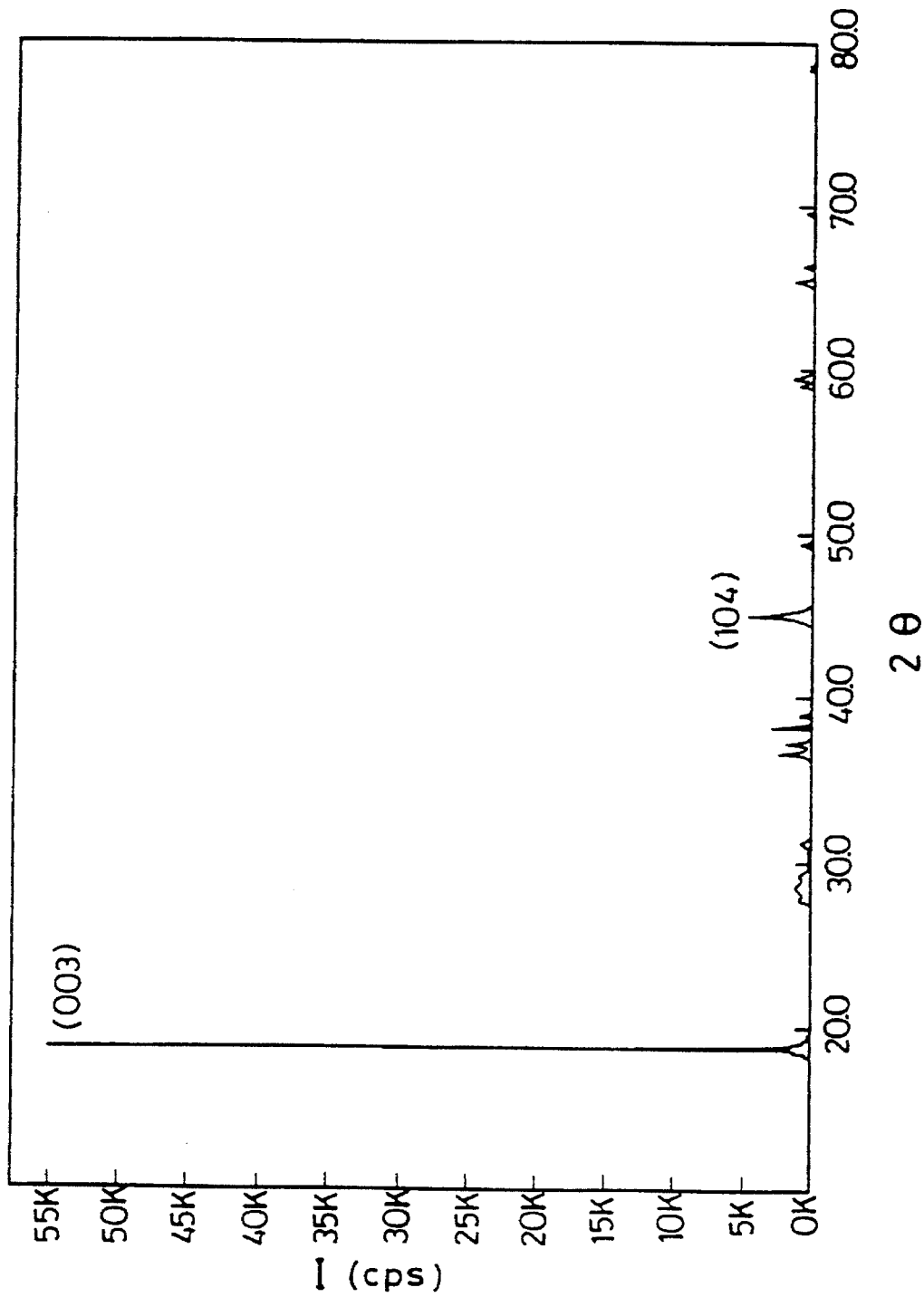
FIG. 7 is an X-ray diffraction pattern of sample No. 31.

FIG. 7 is a X-ray diffraction spectrum of sample No. 33. It is seen from FIG. 7 that $I_{003}/I_{104}$ is 12.2. A comparison between FIG. 7 of sample 33 and FIG. 3 of sample No. 1 indicates that sample No. 33 is significantly improved in degree of orientation over sample No. 1.

A cell constructed using sample No. 33 had an improved charge/discharge capacity of 148 Wh/kg.

These advantages obtained by firing at temperatures above 1,000° C. were equally found in the remaining inventive samples mentioned above.

EXAMPLE 10

Sample No. 41 was prepared by the same procedure as sample No. 1 of Example 1 except that the pellet was subject to hot press sintering under conditions of 850° C., 35 hours and a pressure of 300 kg/cm². It was found that crystallites partially crystallized into amorphous large crystallite grains, forming a laminar structure. The grain size was about 60 µm. A X-ray diffraction spectrum of sample No. 41 showed a $I_{003}/I_{104}$ ratio of 8.0, indicating a significantly improved degree of orientation. A cell constructed using sample No. 41 had an improved charge/discharge capacity of 146 Wh/kg.

These advantages obtained by firing under pressure were equally found in the remaining inventive samples mentioned above.

There has been described a layer structure oxide having an enlarged crystallite size so that a secondary cell constructed using the oxide as a positive electrode material may have an increased discharge capacity.

Japanese Patent Application Nos. 62107/1994, 95563/1994, and (filed Jun. 8, 1994) are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A material composed of an oxide in crystalline form having a composition of the formula: $AMO_2$ wherein A is at least one of lithium and sodium and M is at least one member selected from the group consisting of cobalt, nickel, iron, and chromium, wherein
   at least one additive element Z selected from the group consisting of bismuth, lead, and boron is present in the form of an oxide on the surface of crystallites or between crystallites and essentially no amount of Z is present in $AMO_2$ crystallites as a partial substitute for M.

2. The material of claim 1 which is prepared by adding said additive element Z to a source powder of said layer structure oxide, followed by firing.

3. The material of claim 1 which is prepared by adding said additive element Z to a mixture of a source compound from which said element A is derived and a source compound from which said element M is derived, followed by firing.

4. The material of claim 1 wherein the atomic ratio of said additive element Z to said element M, Z/M, is up to 0.1.

5. The material of claim 4 wherein the atomic ratio of Z/M is at least 0.0001.

6. The material of claim 2 or 3, wherein an additional amount of said element A in excess of that necessary to prepare $AMO_2$ crystallites is further added so as to give an atomic ratio of excess A/Z of up to 2, prior to firing.

7. The material of claim 1 wherein said crystallites have a mean diameter of at least 2 μm.

8. The material of claim 1 wherein on X-ray diffractometry analysis, (003) and (104) peaks appear in the X-ray diffraction spectrum such that $I_{003}/I_{104}$ is at least 2 wherein $I_{003}$ and $I_{104}$ are the intensity of (003) and (104) peaks, respectively.

9. The material of claim 2 or 3 wherein firing is effected at a temperature of at least 1,000° C.

10. The material of claim 2 or 3 wherein firing is effected under pressure.

11. The material of claim 1 which is used as a positive electrode of a secondary cell.

* * * * *